(12) United States Patent
Vicovan et al.

(10) Patent No.: US 9,626,170 B2
(45) Date of Patent: Apr. 18, 2017

(54) METHOD AND COMPUTER PROGRAM PRODUCT FOR DISASSEMBLING A MIXED MACHINE CODE

(71) Applicants: Ionut-Valentin Vicovan, Bucharest (RO); Razvan Ionescu, Bucharest (RO); Radu-Marian Ivan, Bucharest (RO); Mihail Nistor, Bucharest (RO)

(72) Inventors: Ionut-Valentin Vicovan, Bucharest (RO); Razvan Ionescu, Bucharest (RO); Radu-Marian Ivan, Bucharest (RO); Mihail Nistor, Bucharest (RO)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/899,231

(22) PCT Filed: Jul. 18, 2013

(86) PCT No.: PCT/IB2013/055918
§ 371 (c)(1),
(2) Date: Dec. 17, 2015

(87) PCT Pub. No.: WO2015/008115
PCT Pub. Date: Jan. 22, 2015

(65) Prior Publication Data
US 2016/0147517 A1    May 26, 2016

(51) Int. Cl.
G06F 9/44    (2006.01)
G06F 9/45    (2006.01)
G06F 11/36    (2006.01)

(52) U.S. Cl.
CPC ............ *G06F 8/53* (2013.01); *G06F 11/3636* (2013.01)

(58) Field of Classification Search
None
See application file for complete search history.

(56) References Cited

U.S. PATENT DOCUMENTS

| 5,949,993 | A | 9/1999 | Fritz |
| 8,516,309 | B1 * | 8/2013 | Kulkarni ............ G06F 11/0793 714/38.1 |
| 2002/0147963 | A1 * | 10/2002 | Lee .......................... G06F 8/34 717/108 |
| 2009/0327937 | A1 * | 12/2009 | Lachner ............. G06F 11/3664 715/764 |

(Continued)

FOREIGN PATENT DOCUMENTS

KR    10-2001-0037625 A    5/2001

OTHER PUBLICATIONS

International Search Report for the International application No. PCT/IB2013/055918 dated Feb. 24, 2014.

*Primary Examiner* — Philip Wang (57) ABSTRACT

A method and a computer program product for disassembling a mixed machine code are described. The machine code is provided as a sequence of code items including one or more instructions and one or more data items. The method comprises: storing the sequence of code items in accordance with a corresponding sequence of addresses; executing the machine code, thereby generating an execution trace; and partitioning the sequence of addresses into instruction address blocks and data address blocks on the basis of control data, the control data comprising at least the execution trace.

20 Claims, 10 Drawing Sheets

(56) References Cited

U.S. PATENT DOCUMENTS

| | | | | |
|---|---|---|---|---|
| 2010/0115494 A1* | 5/2010 | Gorton, Jr. | ........... | G06F 11/3466 717/128 |
| 2011/0099635 A1* | 4/2011 | Silberman | ............... | G06F 21/56 726/24 |
| 2013/0232323 A1* | 9/2013 | Lerouge | .................. | G06F 21/14 712/233 |
| 2016/0170820 A1* | 6/2016 | Strong | ................ | G06F 11/3466 714/37 |

* cited by examiner

Fig. 1

```
int value = 0;
switch (n %10) {
    case 0:
    case 1:
        value += 9;
        break;
    case 2:
        value += 8;
        break;
    case 3:
        value += 7;
        break;
    case 4:
        value += 6;
        break;
    case 5:
        value += 5;
        break;
    case 6:
        value += 4;
        break;
    case 7:
        value += 3;
        break;
    case 8:
        value += 2;
        break;
    case 9:
        value += 1;
        break;
    default :
        break;
}
```

METHOD AND COMPUTER PROGRAM PRODUCT FOR DISASSEMBLING A MIXED MACHINE CODE

FIELD OF THE INVENTION

This invention relates to a method and computer program product for disassembling a mixed machine code.

BACKGROUND OF THE INVENTION

An assembler is a program for converting source code into executable machine code. A disassembler is a program for converting the machine code back into source code. The source code thus generated is however, in general, not identical to the original source code and may be more difficult to understand for a programmer. In other words, a disassembler is a program for translating executable binary code (machine code) into human readable code (source code or disassembly). A disassembler thus performs a process inverse to that performed by an assembler. A disassembled piece of code may be referred to herein as a disassembly.

Disassembling is used for various applications, such as reverse engineering and profiling. Profiling is a form of program analysis in which dynamic information about a program is gathered during one or several runs of the program. Profiling produces profiling data which may include instruction level profiling data, i.e., information associated with individual instructions of the program, such as an indication as to how often a specific instruction is executed.

Incorrect disassembly information may result in incorrect profiling data. A frequent scenario in which this may happen is when the original source code, i.e., the code from which the machine code was generated, contains switch tables in loops. Compiling the source code may result in switch tables in the machine code which may contain data embedded in executable code. The machine code may thus comprise executable code as well as data. Such code is referred to herein as mixed code.

In an attempt to disassemble mixed code, data included in the mixed code may be mistaken for executable code and be disassembled as if it were executable code. This may produce a list of instructions in the disassembled code that may be very different from the instructions that are actually executed by the device running the program. The profiling information may, in this case, be heavily corrupted.

This problem may be particularly severe in the case of processing devices in which each instruction has a variable size and takes a known amount of time or clock cycles to execute and in which a trace generated when running the program contains only indirect branches. Examples of such processing devices include certain types of microprocessors or microcontrollers. The Freescale HCS08 microcontroller units are examples of such devices.

This kind of problem may also appear in architectures that support multiple instructions sets and switch between instruction sets on the basis of an instruction operation code (op code). Examples of such architectures include Freescale ARM processors that support THUMB and ARM instruction sets.

In these cases, profiling an application may require disassembling the executed code and processing it instruction by instruction. In fact, an incorrect disassembly for one small portion of the code may result in incorrect result for the entire profile.

Existing disassemblers are usually incapable of disassembling mixed code, i.e., instructions and data, on the basis of, e.g., a binary executable image or a block of code read from a target. In order to disassemble a piece of mixed code correctly, a disassembler needs to know which portions of the mixed code are instructions and which portions are data. Otherwise, the disassembler may misinterpret data as instructions and disassemble the machine code incorrectly from the first data item until a point where, e.g., debug information generated by the compiler allows the disassembler to recover and disassemble correctly from that point onward.

Figure 1:
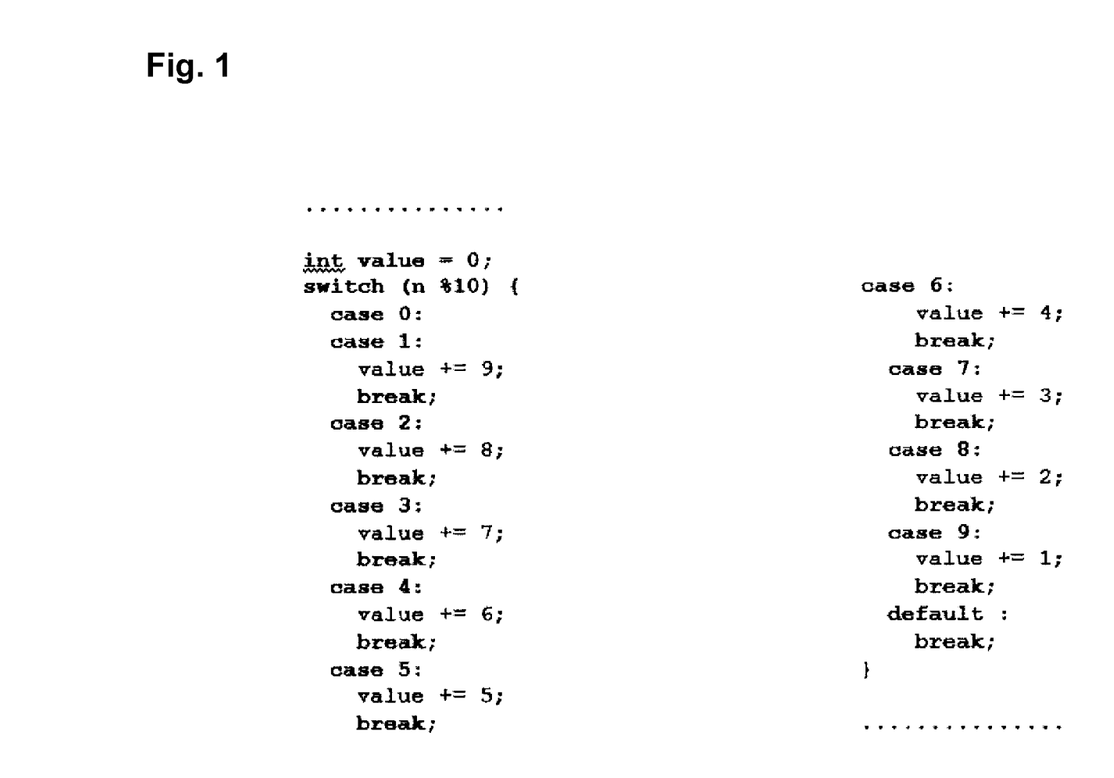
FIG. 1 shows an example of a switch list in a source code.

FIG. 1 shows an example of a snippet of code written in C compiled and disassembled for a Freescale MC9SO8 microcontroller unit (MCU).

FIG. 2 shows a correct disassembly of this snippet, as provided by the compiler wherein addresses have not been relocated.

Figure 3:
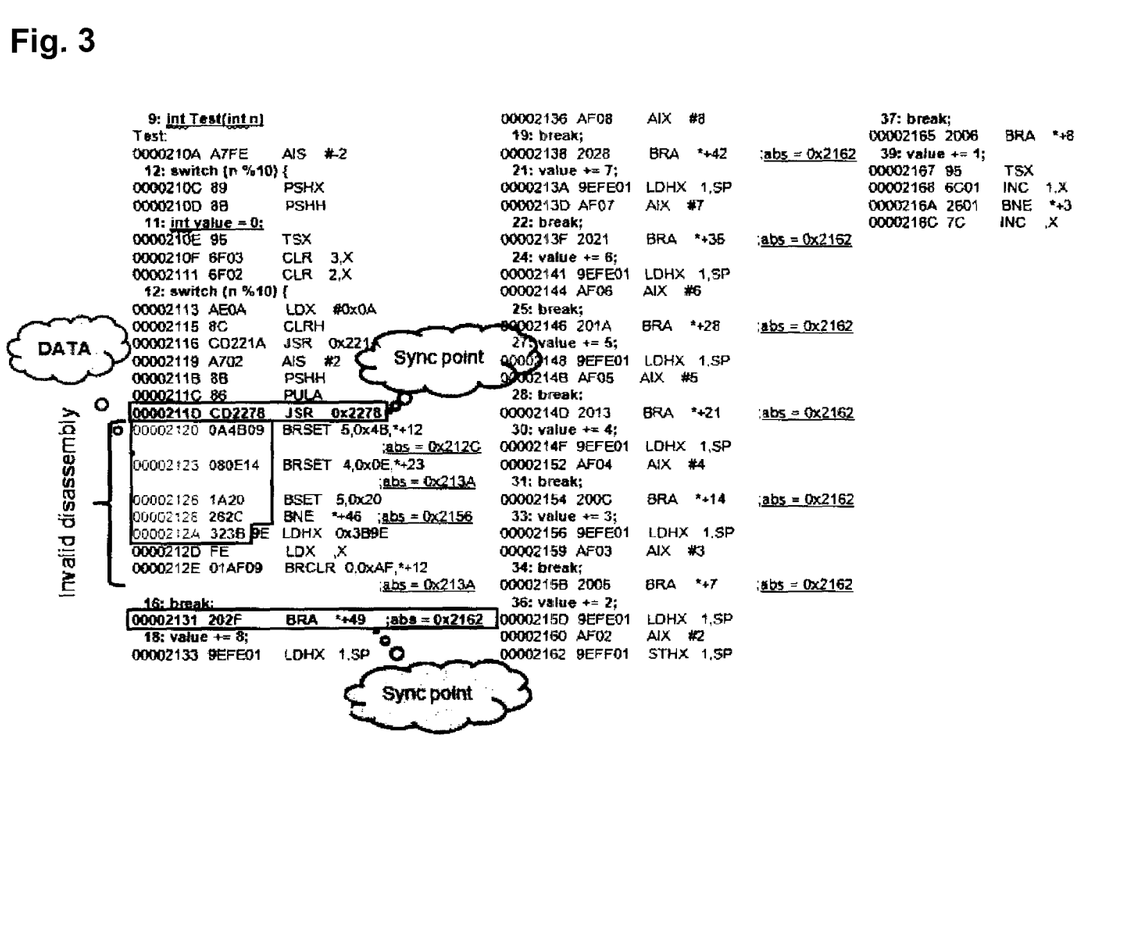
FIG. 3 shows an example of a source code obtained by disassembling the executable code incorrectly using ELF.
Figure 4:
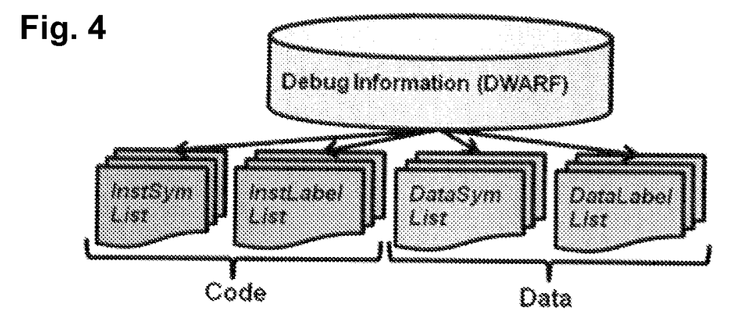
FIG. 4 schematically shows an example of DWARF debug information.

FIG. 3 shows an example of an incorrect disassembly obtained on the basis of the same piece code as the correct disassembly shown in FIG. 2. The binary code may have been provided in, e.g., the executable and linking format (ELF). The incorrect disassembly shown in FIG. 3 has been obtained by a disassembler decoder wherein addresses have been relocated.

As mentioned above, a disassembler is a tool which translates machine language into, e.g., assembly language. Notably, a disassembler may be arranged to parse the binary executable code and to generate a corresponding list of assembly instructions.

A disassembly is an output of a disassembler. It is a list of assembly instructions in a human readable form.

Profiling is an example of a dynamic program analysis. Profiling may include measuring the memory usage or time complexity of a program, the usage of particular instructions, the usage of all instructions, and the frequency and duration of function calls, for example. Profiling information is commonly used for program optimization.

A profile is a summary of events observed during profiling, provided in a human readable or graphical form. A profile may notably include statistical information of events occurring during a run of the program in question.

Operation code (op code) is the part of a machine language instruction that specifies the operation to be performed. Apart from the op code itself, an instruction normally also has one or more specifiers for operands, i.e., data on which the operation should act.

An instruction set or an instruction set architecture (ISA) is a part of a computer that includes native data types, instructions, registers, addressing modes, memory architecture, interrupt and exception handling, and external input/output (i/o), as well as a specification of a set of op codes (usually provided in machine language), and native commands implemented by a particular processor. In the present description, the expression "instruction set" refers only to the set of op codes for the computer in question.

A procedure or routine or function is a sequence of program instructions that performs a specific task. Each procedure has a start address, may support arguments, and may return values on, e.g., stack or in registers, depending on the calling convention used by the compiler. An entry point is the first instruction in a procedure. Execution of the procedure thus starts with the entry point. The entry point may be the destination of a call instruction. The address of the entry point is known as the procedure start address.

A change of flow instruction is an instruction which breaks the sequential execution of a program, for instance, by triggering a jump to another location in the binary code. Calls, branches, returns (from, e.g., procedures, exceptions, or interrupts), and interrupts are examples of change of flow instructions.

A call instruction is an instruction which performs a jump to a procedure/routine. A call instruction may save a return address on stack and then perform the jump to the routine entry point.

A branch instruction is a change of flow instruction which does not save the return address or other information but forces the program to continue execution from the target address. Branches which occur inside a procedure usually do not jump outside the scope of the procedure.

A return instruction is an instruction which jumps to the address saved on the stack by a call instruction.

A switch table is a table with destination addresses for the code to be executed for various cases of a switch statement. It may be generated by the compiler.

A microcontroller unit (MCU) is a small computer on a single integrated circuit. A MCU may contain, e.g., a processing core, a memory unit, and input/output peripherals. The input/output peripherals may be programmable.

DWARF is a widely-used, standardized debugging data format. It was originally designed along with the executable and linkable format (ELF), although it is independent of object file format.

A debug symbol is a debug data structure associated with a block of code or data containing information relating to its declaration or appearance in the source type (program or data), scope level, and location (start address and, for functions, also end address). In this description, the expression "debug symbol" will refer only to function and data symbols with size (start and end address). Other debug symbols will be named "debug labels".

A debug label is a debug data structure associated with an address in the address space of a program, wherein the address has a special meaning such as the start of an instruction or data block, destination of a branch, or other kind of special meaning.

A hardware trace is program execution information generated by the processor encoded and stored in a device-dependent fashion. A hardware trace can be extracted in device-dependent fashion, namely in real time or in an intrusive manner. The trace may be extracted in real time by outputting it continuously to an output port and using a dedicated probe to capture the output information. The trace may be extracted intrusively by reading it from a dedicated buffer or a memory region only when the processor is suspended.

Furthermore, the following definitions are newly introduced in the present specification:

A block list is a list of disjunct address blocks. An important property of a block as defined herein is that its start address is guaranteed to be a valid instruction or data address.

A disassembled instruction list is a list of disassembled instructions. Each instruction entry may contain, for example, the following information: an address, a size, an op code bytes vector, and a description string. A problematic instruction list is a list of disassembled instructions found to be invalid.

A target address list is a list of addresses which represent targets, i.e., destinations, of change of flow instructions.

A trace instruction address list is a list of the addresses of instructions that have been executed.

A trace data address list is a list of addresses which is extracted from the trace and indicates addresses at which data access operations have been carried out, i.e., addresses from which non-execution data has been read or at which non-execution data has been written.

SUMMARY OF THE INVENTION

The present invention provides a method and computer program product for disassembling a mixed machine code as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 2 shows an example of a source code obtained by compiling the source code of FIG. 1 to generate executable code and then disassembling the thus generated executable code.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

FIGS. 4 to 11 schematically illustrate an example of a method for disassembling a mixed machine code. The machine code may be provided as a sequence of code items. The sequence of code items may comprise one or more instructions and one or more data items. The method comprises: storing the sequence of code items in accordance with a corresponding sequence of addresses; executing the machine code, thereby generating an execution trace; and partitioning the sequence of addresses into instruction address blocks and data address blocks on the basis of control data, the control data comprising at least the execution trace. In other words, it is proposed to use the execution trace as control data for disassembling the machine code. The control data may, however, include further data, e.g., debug information, in addition to the execution trace. Using the execution trace instead of or in addition to other control data, e.g., may allow determining at least for some of the code items of the machine code whether they are instructions or data items.

Each instruction address block of the address sequence may be translated into assembly language. In one example, the entire sequence of code items, including data items, is translated. This may be done before partitioning the sequence of addresses intro instruction blocks and data blocks. The translated code may, in this case, comprise translated instruction blocks as well as translated data blocks. In one variant of the method, the entire sequence of code items is translated before partitioning the corresponding address sequence. The translated sequence of code items may then be included in the control data for partitioning the address sequence. Any code item or block of code items identified as data may be discarded for further consideration. In another example, code items of blocks of code items identified as data may be discarded only in a final step as there may be a likelihood of determining that a code item identified as data is, in fact, an instruction—this may occur, for example, when new trace data is taken into account after, e.g. a first partitioning operation. An instruction address sequence, i.e., a sequence of instruction addresses, may be generated by removing any data address blocks from the address sequence. The translated instruction address blocks, i.e., at least parts of the dissembled code, may, for example, be displayed on a screen or be printed on a print medium, thus enabling a programmer or program analyst to analyze the program, e.g., in order to correct programming errors or to make the program more performing. Alternatively or in addition, the translated instruction address blocks may be used as input to, e.g., a profiling tool.

The proposed method may be made particularly reliable by verifying, for each or at least one of the instructions, whether the respective instruction is fully contained in one of the instruction address blocks that were obtained by partitioning the address sequence associated with the sequence of code items. If the respective instruction is not fully contained in one of the instruction address blocks, the instruction address sequence may be corrected.

The execution trace may notably comprise a sequence of accessed instruction addresses, and a sequence of accessed data addresses. An accessed instruction address is the address of a memory location from which an instruction was read in the course of executing the machine code, by, e.g., a processor. A program counter may be provided for indicating a current instruction address, i.e., the address of the next instruction to be fetched by, e.g., a processor. The sequence of accessed instruction addresses may thus reflect the evolution of the value of the program counter value.

The control data may further include debug information. The debug information may be generated along with the machine code by compiling a source code. The source code may be written in any suitable programming language, such as Assembler, C, or Fortran. The debug information may, for example, be generated in the DWARF format. The debug information may notable comprise one or more of the following: one or more instruction symbols; one or more data symbols; one or more instruction labels; and one or more data labels. Each instruction symbol may specify an instruction address block. Each data symbol may specify a data address block. Each instruction label may specify an instruction address. Each data label may specify a data address.

The control data may further comprise one or more target addresses. The target addresses may, for example, be determined on the basis of the machine code, debug information, and the execution trace.

The address sequence may be partitioned in a sequence of iterations. Each iteration may result in a partition that is more reliable than the partition obtained in the preceding iteration. Any of iteration, except the very first one, may comprise: updating the execution trace, or updating the debug information; partitioning each instruction address block from the preceding iteration into one or more new instruction address blocks and none, one, or more new data address blocks; and partitioning each data address blocks from the preceding iteration into one or more new data address blocks and none, one, or more new instruction address blocks.

The proposed method may be carried out conveniently using a computer. To this end, a computer program product may be provided. The computer program product may contain instructions for instructing the computer to carry out the method.

The above-mentioned problem of distinguishing between instructions and data may thus be overcome by using trace information, preferably in conjunction with debug information, to disassemble the machine code. Profiler tools, such as Freescale CodeWarrior, which use a disassembly as input data may thus be made more precise and reliable.

More specifically, it is proposed to verify and correct a disassembly by using trace information, preferably in conjunction with debug information. Trace information may also be referred to as the trace. Trace information is information for debugging and code analysis which is generated while running a program. A trace may notably enable a code developer or a code analysis tool to reconstruct a sequence of instructions executed by the processing device.

The disassembly may be corrected, for example, using an iterative process by continuously checking and correcting the disassembly when new trace information becomes available. This may be particularly powerful, for example, when no or little debug information is available. The debug information may be used for an initial analysis to decrease the computational effort at run time when collecting, e.g., multiple buffers or traces.

Figure 5:
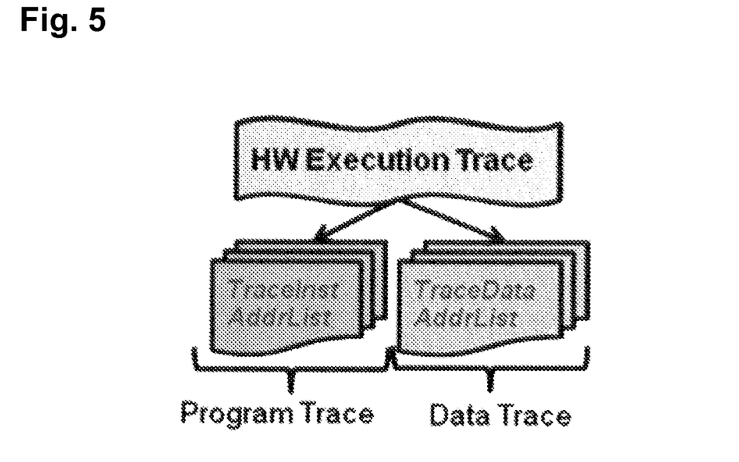
FIG. 5 schematically shows an example of a hardware execution trace.
Figure 6:
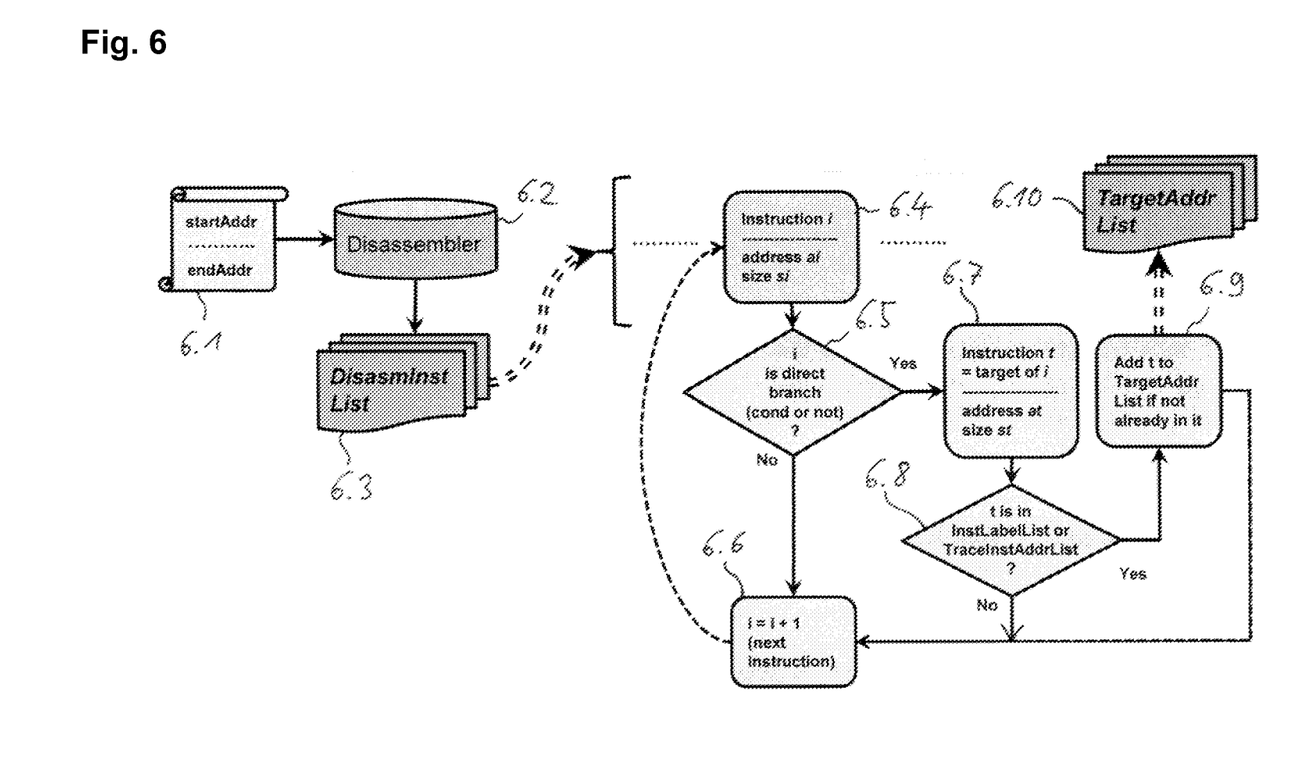
FIG. 6 shows a flow chart of an example of generating a list of target addresses.

The control data or input data of the proposed method may include three categories of information, namely debug information (see FIG. 4), trace information (see FIG. 5), and a list of target addresses (see FIG. 6). The debug information may, for example, be provided in the DWARF format. The debug information may comprise various lists, such as an instruction symbol list, a data symbol list, and an instruction label address list (see FIG. 4). The instruction symbol list is a list of symbols, each symbol having a start address and a size. The instruction symbol list may be ordered in accordance with the symbol start addresses. The data symbol list is a list of data symbols. Each data symbol has a start address and a size. The data symbol list may be ordered in accordance with the data symbol start addresses. The instruction label address list and the data label address list are lists of instruction labels and data labels, respectively. A label comprises at least an address of an instruction or an address of a data item, respectively. The address may be enhanced by using instruction addresses from line number debug information, if available.

The trace information may comprise an executed address list and a data access address list. The executed address list and the data access address list may both be extracted from the trace or be generated on the basis of the trace. Both the executed address list and the data access address list may be ordered by address.

It is noted that the DWARF information may be used for pre-processing and, in an implementation in which the collection is iterative, for reducing the number of corrections done by the trace information (which may require a large number of iterations).

A list of target addresses (target address list) may, for instance, be generated as follows. A given address range [start address, end address) may be disassembled using a suitable disassembler tool, yielding a disassembled instruction list. The disassembled instruction list may be evaluated to generate a list of target addresses which are not in the instruction address lists from DWARF symbols/labels or traces. As schematically shown in FIG. 6, a piece of executable code with a start address and an end address may be disassembled using a disassembler to generate a disassembled instruction list, i.e., a list of disassembled instructions. The executable code may be binary code. The disassembled instruction list may be provided in a text format. For each instruction (box 6.1) of the disassembled instruction list, it may be determined (box 6.5) if the instruction is a direct branch. If the instruction is not a direct branch, the next instruction (box 6.6) may be considered, and the process flow may continue in box 6.4. If, however, the instruction is a direct branch, a target instruction T may be defined (box 6.7) for the respective instruction. The target instruction T may, for example, be extracted from the respective instruction. In another example, the target instruction T may be declared for the respective instruction. The target instruction T may be associated with a target address AT and a size ST. It may then be determined (box 6.8) whether the target T is contained in the instruction label list or in the trace instruction address list. If the target T is not contained in any of these lists, the process flow may continue in box 6.6 with the next instruction I. If, however, the target T is contained in one of these lists, the respective target may be added (box 6.9) to the target address list (box 6.10) if it is not already in this list. The process flow may then continue in box 6.6.

Figure 7:
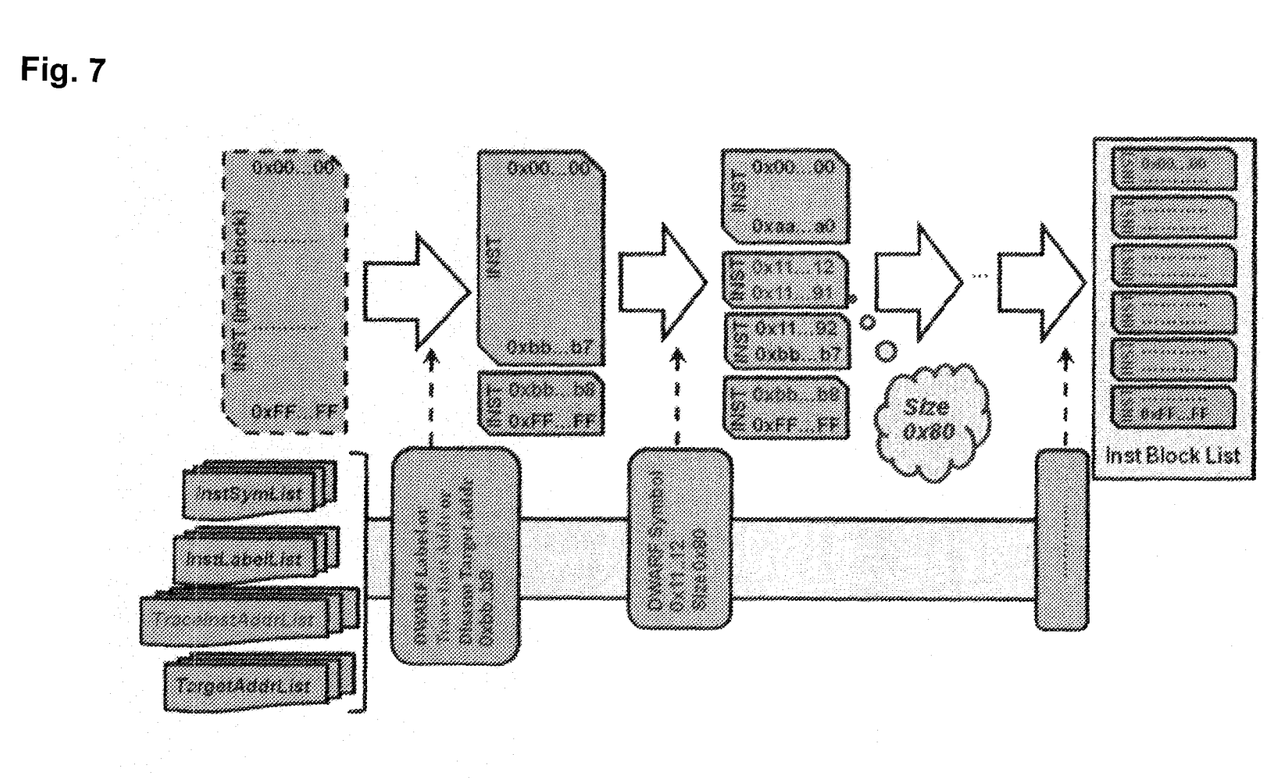
FIG. 7 shows a flow chart of an example of a method of generating an instruction block list.

The control data, i.e., the input data, may be arranged in the form of a list of disjunct address blocks (block list). A block is a contiguous address range [start, end) of a certain type, namely either instruction or data. Referring now to FIG. 7, the disassembled instruction list (box 6.3 in FIG. 6) may be split into blocks in an iterative manner. More specifically, for each symbol or label contained in the instruction symbol list, the instruction label list, the trace instruction address list, or the target address list, existing blocks may be split into smaller blocks. Each block list may be updated anytime for new data. The input data may be obtained from, e.g., DWARF, trace, or disassembly.

Figure 8:
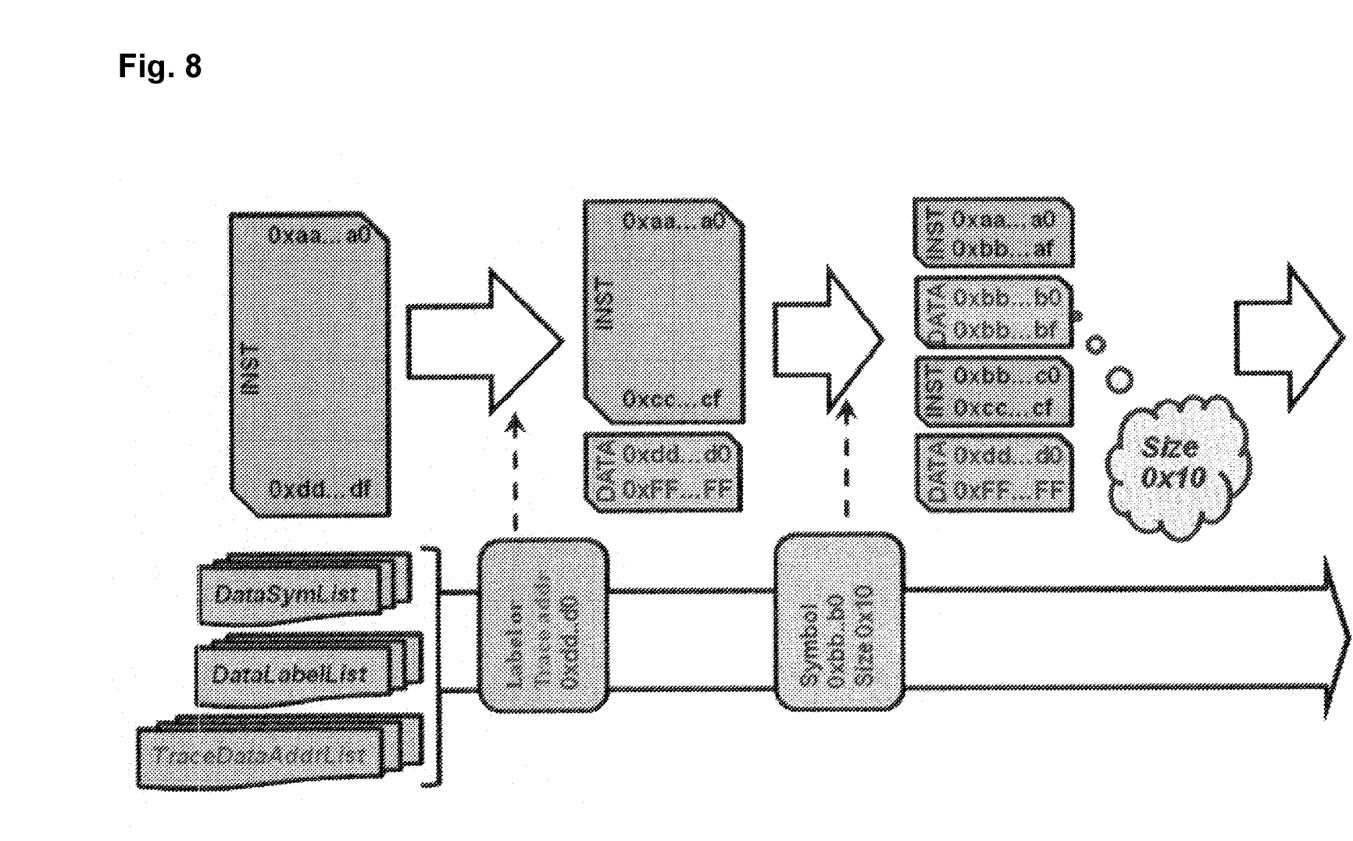
FIG. 8 shows a flow chart of an example of a method of generating an instruction block list.
Figure 9:
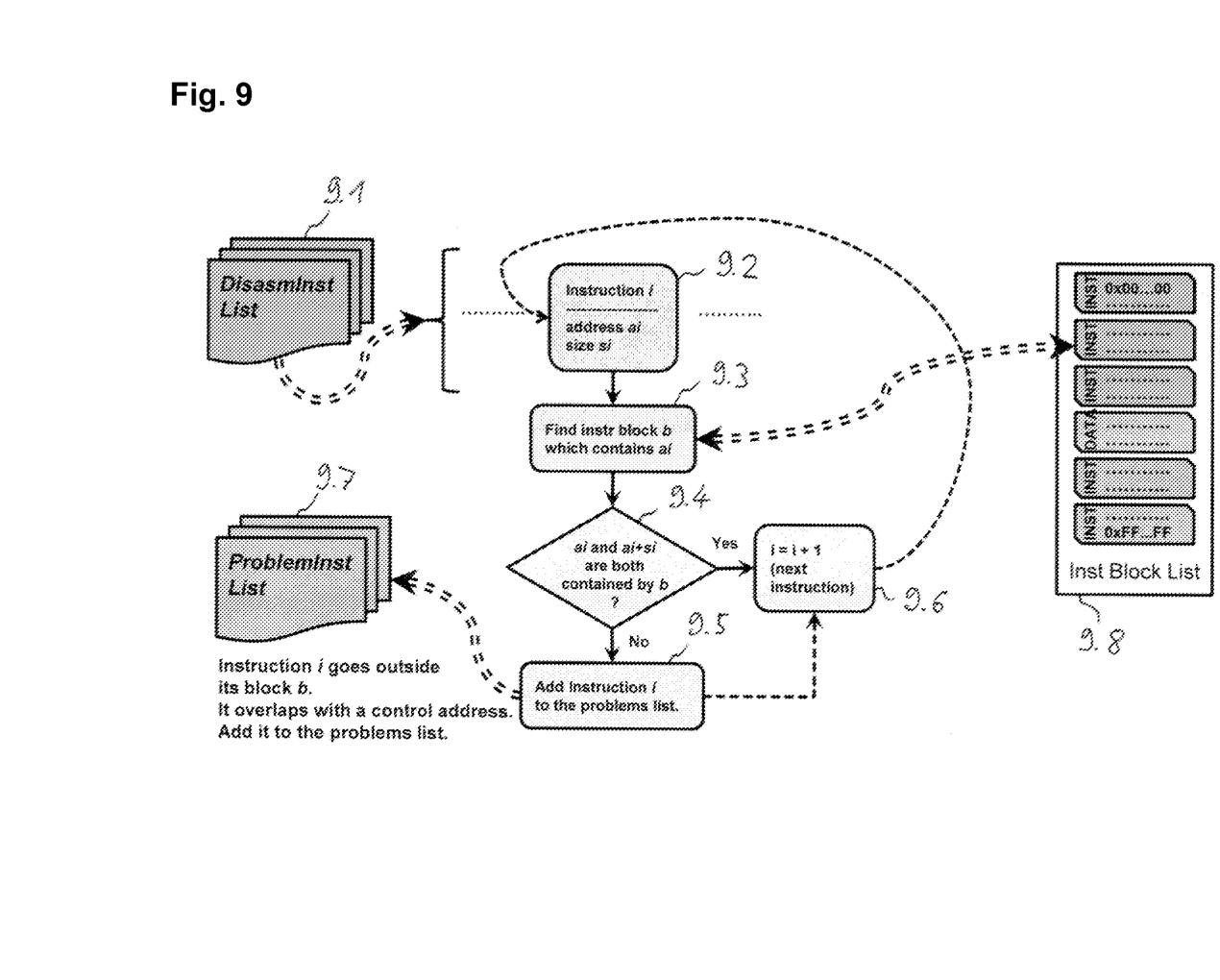
FIG. 9 shows a flow chart of an example of an embodiment a method of verifying whether the disassembly is correct

Referring now to FIG. 8, if data and code do not have separate address spaces, the existing instruction blocks may be split again in order to remove the data sections.

As a result, an ordered list of disjunct address ranges containing only instruction addresses and no data addresses may be obtained. In other words, any data address ranges may be removed from the disassembled instruction list.

A disassembled instruction list thus generated, i.e., a disassembly instruction list expected to contain only instruction addresses, may be examined and, if necessary, corrected using, e.g., the instruction block list as input data. An example of a method of verifying whether the disassembly is correct is illustrated by the flow chart in FIG. 9. For each instruction I (box 9.2) of the disassembled instruction list (box 9.1), an instruction block B which contains the address AI of the instruction I may be determined (box 9.3). It may then be examined (box 9.4) whether the address AI+SI is also contained inside the block B (box 9.8). If AI and AI+SI are both contained in block B, the next instruction may be considered (box 9.6) and the method may continue in box 9.2. If, however, it is determined that AI and AI+SI are not both contained in block B, this means that the instruction I overlaps with a control address. It may therefore be added to the problematic instruction list (box 9.5), i.e., the list of problematic instructions (box 9.7). Thus, a list of problematic instructions may be generated. If the list of problematic instructions remains empty, this is an indication that the list (box 9.1) of disassembled instructions is correct. From box 9.5, the process flow may proceed to box 9.6, and the next instruction I may be considered.

Figure 10:
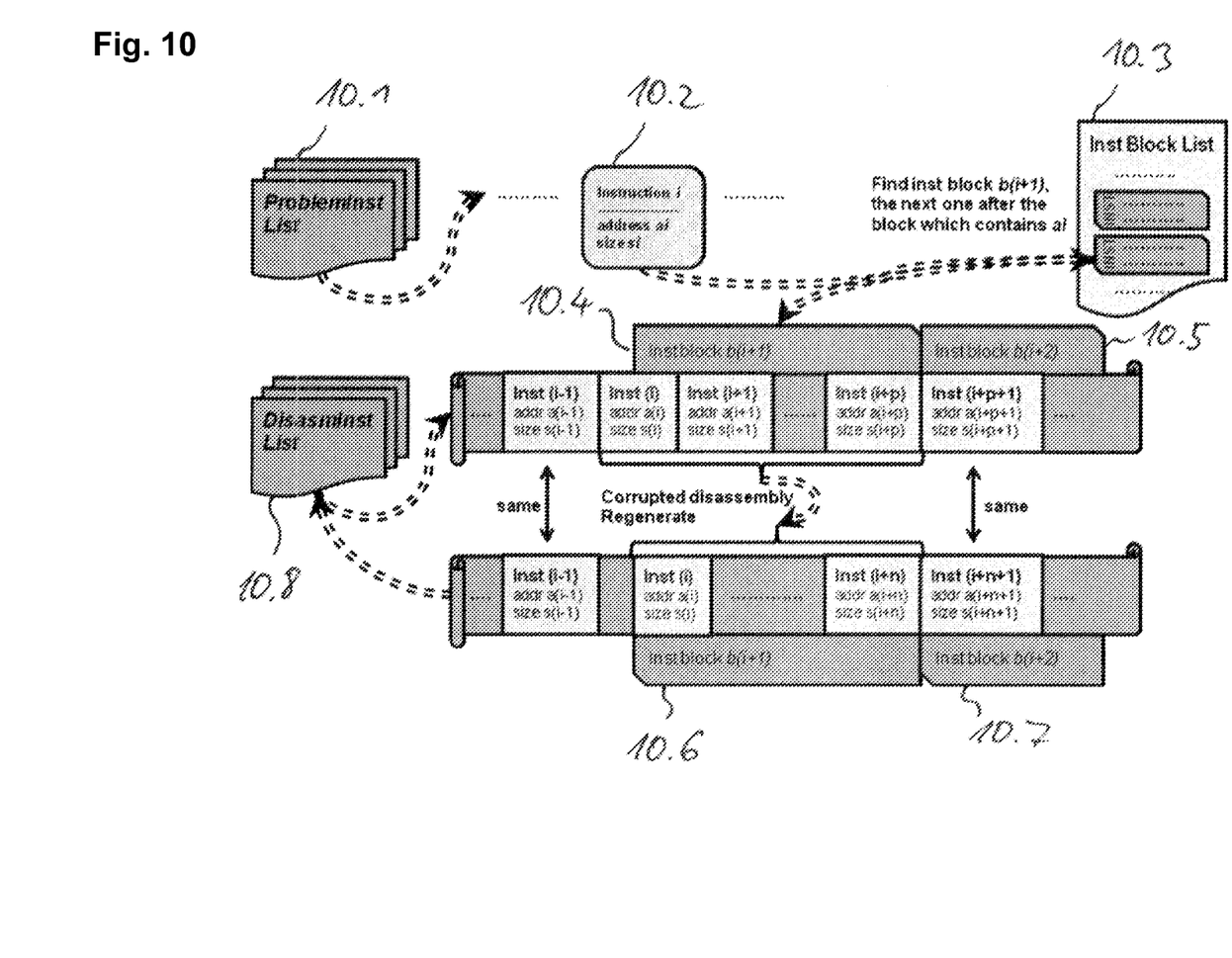
FIG. 10 shows a flow chart of an example of an embodiment of a method of correcting the disassembly.

Referring now to FIG. 10, the flow chart shown therein illustrates an example of a method for correcting the disassembly, i.e., for correcting a list of disassembled instructions. Starting from a list of problematic instructions (box 10.1), each instruction I (box 10.2) contained in the list of problematic instructions box 10.1 may be analyzed. For the instruction I, the instruction block B (I+1) in the instruction block list (box 9.8 in FIG. 9/box 10.3 in FIG. 10) may be analyzed. The block B (I+1) is the block succeeding the block containing the address AI of the instruction I. The blocks B (I+1) and B (I+2) are schematically represented as boxes 10.4 and 10.5 of the Figure. Invalid instructions contained in the instruction block list may be removed, thus resulting in corrected instruction blocks, e.g., blocks B (I+1) and B (I+2) (boxes 10.6 and 10.7). A corrected disassembled instruction list may thus be generated (box 10.8).

The above algorithm may be used in several scenarios. In a first scenario, all debug information and trace information is available at the start, i.e., when a first disassembly is performed. In a second scenario, some of the information, e.g., trace information, is not available from the start. In a third scenario, no information, e.g., no debug information, is available at the start. In this case, the initial disassembly may be refined or corrected when trace information becomes available or new debug information is loaded.

The processing flow may be iterative. In an initial step, debug information and trace, if available, may be acquired. The instruction block list may be generated, the binary executable code (machine code) may be initially disassembled, and a target address list may be generated, resulting in an initial disassembly, and an initial disassembly check and correction may be performed.

Subsequently, if new information has been gathered, the block list may be updated, and the disassembly may be checked and corrected again.

Blocks in the block list may always start from a valid instruction or data address. Trace information may override, if necessary, the DWARF debug information when the blocks in the block list are split. Any DWARF inconsistencies may thereby also be fixed.

Figure 11:
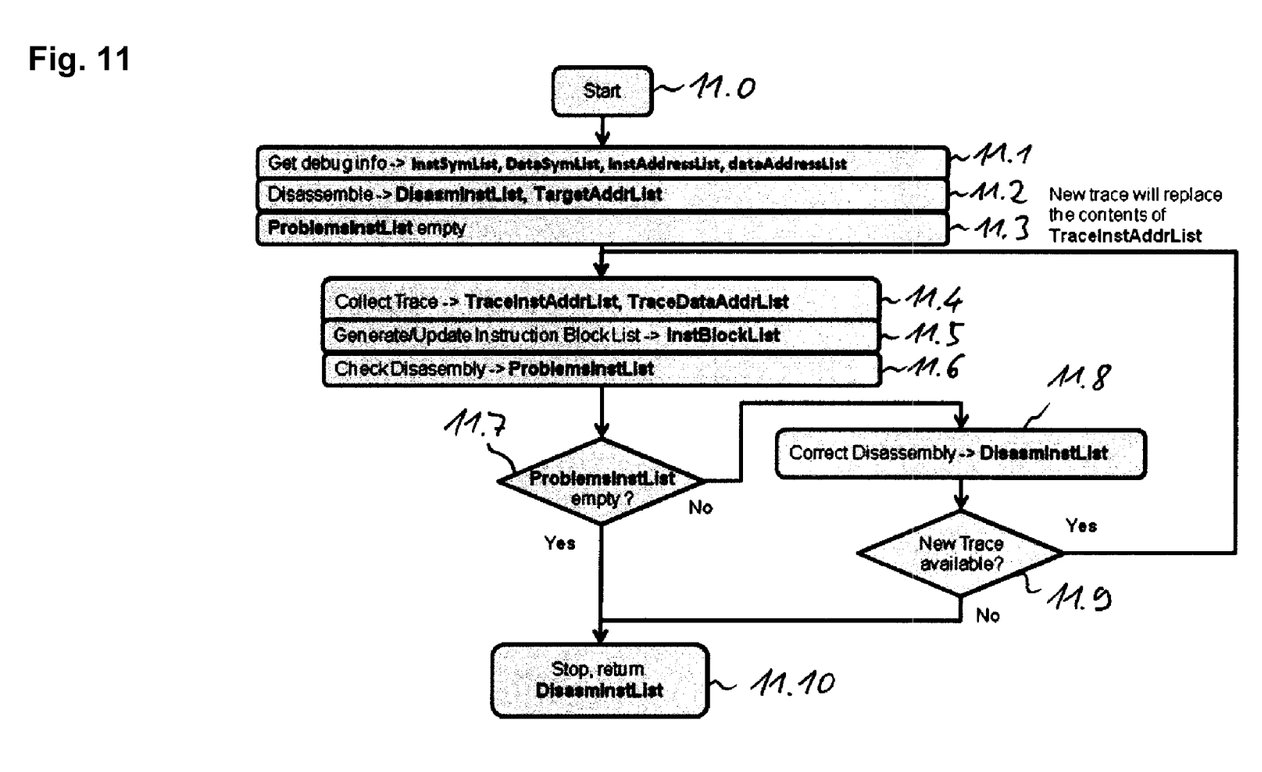
FIG. 11 shows a flow chart of an example of an embodiment of a method of disassembling an executable code.

The flow chart in FIG. 11 illustrates an example of a method of correcting a disassembly. The method may start in box 11.0. In subsequent box 11.1, debug information may be gathered. The debug information may, for instance, include an instruction symbol list, a data symbol list, an instruction address list, and a data address list.

The binary executable code may be disassembled (box 11.2) to generate a disassembled instruction list and a target address list. In subsequent box 11.3, a list of problematic instructions (problematic instruction list) may be generated. The problematic instruction list may be empty at this stage. In subsequent box 11.4, the binary executable code may be executed on a computer, resulting in a trace which may be collected. A trace instruction address list and a trace data address list may be extracted from or generated on the basis of the trace. In subsequent box 11.5, an instruction block list may be generated or updated, resulting in an up-to-date instruction block list. In subsequent box 11.6, the disassembly may be checked, and problematic instructions may be added to the problematic instruction list. In subsequent box 11.7, it may be determined whether the problematic instruction list is empty. If the problematic instruction list is not found to be empty, i.e., if it contains one or more entries, the disassembly may be corrected to generate a corrected disassembled instruction list (box 11.8). It may then be checked whether new trace has become available (box 11.9). In this case, the method may proceed in box 11.4, and the new trace may be collected. If, however, no new trace is available, the disassembled instruction list may be returned and the method may stop (box 11.10). If in box 11.7, the problematic instruction list is found to be empty, the operations in box 11.10 may be performed after box 11.7 without performing the operations in boxes 11.8 and 11.9.

The method described herein may notably be used in an integrated development environment with profiling capabilities such as Freescale CodeWarrior tools. Ensuring that a disassembly is correct may contribute to making any profiler tools using the disassembly more precise and reliable.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for disassembling a mixed machine code, wherein the machine code is provided as a sequence of code items, the sequence of code items comprises one or more instructions and one or more data items; and the method comprises:
    storing the sequence of code items in accordance with a corresponding sequence of addresses;
    executing the machine code, thereby generating an execution trace; and
    partitioning the sequence of addresses into instruction address blocks and data address blocks on the basis of control data, the control data comprising at least the execution trace.

2. The method of claim 1, further comprising:
    translating each instruction address block of the address sequence into assembly language.

3. The method of claim 2, further comprising:
displaying one or more of the translated instruction address blocks on a screen or printing one or more of the translated instruction address blocks on a print medium.

4. The method of claim 1, further comprising:
generating an instruction address sequence by removing any data address blocks from the address sequence.

5. The method of claim 4, further comprising:
verifying, for each or at least one of said instructions, whether it is fully contained in one of the instruction address blocks; and
if the respective instruction is not fully contained in one of the instruction address blocks, correcting the instruction address sequence.

6. The method of claim 1, wherein the execution trace comprises a sequence of accessed instruction addresses, and a sequence of accessed data addresses.

7. The method of claim 1, wherein the control data further includes debug information.

8. The method of claim 7, further comprising:
compiling a source code, thereby generating the machine code along with the debug information.

9. The method of claim 7, wherein the debug information is in the DWARF format.

10. The method of claim 7, wherein the debug information comprises one or more of the following:
one or more instruction symbols, each instruction symbol specifying an instruction address block;
one or more data symbols, each data symbol specifying a data address block;
one or more instruction labels, each instruction label specifying an instruction address; and
one or more data labels, each data label specifying a data address.

11. The method of claim 1, where the control data further comprises one or more target addresses and the method further comprises:
determining the one or more target addresses on the basis of the machine code, debug information, and the execution trace.

12. The method of claim 1, comprising:
performing said partitioning of the address sequence in a sequence of iterations.

13. The method of claim 12, wherein at least one of said iterations different from the first iteration comprises:
updating the execution trace, or updating the debug information;
partitioning each instruction address block from the preceding iteration into one or more new instruction address blocks and none, one, or more new data address blocks; and
partitioning each data address block from the preceding iteration into one or more new data address blocks and none, one, or more new instruction address blocks.

14. The method of claim 1, further comprising instructions for instructing a computer to carry out the method.

15. A computer program product for disassembling a mixed machine code, wherein the machine code is provided as a sequence of code items, the sequence of code items comprising one or more instructions and one or more data items, the computer program product comprising:
a memory unit for storing the sequence of code items in accordance with a corresponding sequence of addresses, the sequence of addresses partitioned into instruction address blocks and data address blocks on the basis of control data; and
a processor for executing the machine code to generate the control data comprising at least an execution trace.

16. The computer program product of claim 1, wherein the execution trace comprises a sequence of accessed instruction addresses, and a sequence of accessed data addresses.

17. The computer program product of claim 1, wherein the control data further includes debug information.

18. The computer program product of claim 17, further comprising:
compiling a source code, thereby generating the machine code along with the debug information.

19. The computer program product of claim 17, wherein the debug information is in the DWARF format.

20. The method of claim 17, wherein the debug information comprises one or more of the following:
one or more instruction symbols, each instruction symbol specifying an instruction address block;
one or more data symbols, each data symbol specifying a data address block;
one or more instruction labels, each instruction label specifying an instruction address; and
one or more data labels, each data label specifying a data address.

* * * * *